United States Patent
Nakashima

(10) Patent No.: US 11,952,748 B2
(45) Date of Patent: Apr. 9, 2024

(54) WORK VEHICLE AND CONTROL METHOD FOR WORK VEHICLE

(71) Applicant: KOMATSU LTD., Tokyo (JP)

(72) Inventor: Akira Nakashima, Tokyo (JP)

(73) Assignee: KOMATSU LTD., Tokyo (JP)

( * ) Notice: Subject to any disclaimer, the term of this patent is extended or adjusted under 35 U.S.C. 154(b) by 547 days.

(21) Appl. No.: 17/276,936

(22) PCT Filed: Oct. 31, 2019

(86) PCT No.: PCT/JP2019/042818
§ 371 (c)(1),
(2) Date: Mar. 17, 2021

(87) PCT Pub. No.: WO2020/100615
PCT Pub. Date: May 22, 2020

(65) Prior Publication Data
US 2022/0034069 A1    Feb. 3, 2022

(30) Foreign Application Priority Data

Nov. 16, 2018    (JP) ................................. 2018-215803

(51) Int. Cl.
*E02F 9/22* (2006.01)
*E02F 9/20* (2006.01)
(Continued)

(52) U.S. Cl.
CPC .......... *E02F 9/2253* (2013.01); *E02F 9/2066* (2013.01); *E02F 9/2296* (2013.01);
(Continued)

(58) Field of Classification Search
CPC ..... E02F 9/2253; E02F 9/2066; E02F 9/2296; E02F 3/7613; E02F 3/7618; E02F 9/2228;
(Continued)

(56) References Cited

U.S. PATENT DOCUMENTS

| 5,077,973 A | 1/1992 | Suzuki et al. |
| 2005/0101436 A1* | 5/2005 | Funato .................. F16H 61/468 477/107 |

(Continued)

FOREIGN PATENT DOCUMENTS

| CN | 101002010 A | 7/2007 |
| CN | 101761469 A | 6/2010 |

(Continued)

OTHER PUBLICATIONS

The Office Action for the corresponding Chinese application No. 201980059666.5, dated Aug. 2, 2022.

(Continued)

*Primary Examiner* — Justin Holmes
(74) *Attorney, Agent, or Firm* — Global IP Counselors, LLP

(57) ABSTRACT

A hydraulic pump is driven by an engine. A hydraulic motor is driven by hydraulic fluid discharged from the hydraulic pump thereby causing a vehicle to travel. A controller controls a rotation speed of the engine and a displacement of the hydraulic pump. The controller acquires a tractive force of the vehicle. The controller changes the rotation speed of the engine to a low speed side in accordance with a reduction in the tractive force.

16 Claims, 11 Drawing Sheets

(51) Int. Cl.

| | | |
|---|---|---|
| *F16H 59/44* | (2006.01) | |
| *F16H 59/74* | (2006.01) | |
| *F16H 61/431* | (2010.01) | |
| *F16H 61/465* | (2010.01) | |
| *E02F 3/76* | (2006.01) | |
| *F16H 59/02* | (2006.01) | |
| *F16H 59/36* | (2006.01) | |
| *F16H 59/46* | (2006.01) | |

(52) U.S. Cl.
CPC .............. *F16H 59/44* (2013.01); *F16H 59/74* (2013.01); *F16H 61/431* (2013.01); *F16H 61/465* (2013.01); *E02F 3/7613* (2013.01); *E02F 3/7618* (2013.01); *E02F 9/2228* (2013.01); *E02F 9/2235* (2013.01); *E02F 9/2285* (2013.01); *F16H 59/02* (2013.01); *F16H 2059/366* (2013.01); *F16H 59/46* (2013.01)

(58) Field of Classification Search
CPC ..... E02F 9/2235; E02F 9/2285; E02F 3/7622; E02F 9/2246; E02F 9/2292; F16H 59/44; F16H 59/74; F16H 61/431; F16H 61/465; F16H 59/02; F16H 59/46; F16H 2059/366; F16H 61/421; F16H 61/472; F16H 59/14; F16H 61/468; F16H 63/50; B60Y 2200/411; F02D 29/00; F02D 29/04

See application file for complete search history.

(56) References Cited

U.S. PATENT DOCUMENTS

| | | |
|---|---|---|
| 2007/0101708 A1 | 5/2007 | Ohigashi et al. |
| 2007/0204604 A1 | 9/2007 | Naruse |
| 2009/0217654 A1 | 9/2009 | Iwamoto |
| 2011/0196585 A1 | 8/2011 | Ishibashi et al. |
| 2014/0129114 A1 | 5/2014 | Nishimura |
| 2014/0144129 A1* | 5/2014 | Shirao ............... F15B 15/20 60/459 |
| 2014/0200775 A1 | 7/2014 | Shirao |
| 2015/0315766 A1 | 11/2015 | Take |
| 2016/0024755 A1* | 1/2016 | Kobiki ............... F16H 61/04 180/53.4 |
| 2016/0122977 A1 | 5/2016 | Enomoto |
| 2017/0130428 A1 | 5/2017 | Matsuzaki et al. |
| 2019/0161940 A1 | 5/2019 | Takeda et al. |

FOREIGN PATENT DOCUMENTS

| | | |
|---|---|---|
| CN | 103688089 A | 3/2014 |
| CN | 103717860 A | 4/2014 |
| CN | 104822922 A | 8/2015 |
| CN | 106574559 A | 4/2017 |
| JP | 2-38630 A | 2/1990 |
| JP | 2007-113304 A | 5/2007 |
| JP | 2009-174536 A | 8/2009 |
| JP | 2016-89821 A | 5/2016 |
| JP | 2018-53539 A | 4/2018 |
| WO | 2005/056933 A1 | 6/2005 |
| WO | 2005/098148 A1 | 10/2005 |
| WO | 2010/070962 A1 | 6/2010 |
| WO | 2015/011809 A1 | 1/2015 |
| WO | 2015/064577 A1 | 5/2015 |

OTHER PUBLICATIONS

The International Search Report for the corresponding international application No. PCT/JP2019/042818, dated Jan. 21, 2020.

The Office Action for the corresponding Japanese application No. 2018-215803, dated Sep. 20, 2022.

* cited by examiner

WORK VEHICLE AND CONTROL METHOD FOR WORK VEHICLE

CROSS-REFERENCE TO RELATED APPLICATIONS

This application is a U.S. National stage application of International Application No. PCT/JP2019/042818, filed on Oct. 31, 2019. This U.S. National stage application claims priority under 35 U.S.C. § 119(a) to Japanese Patent Application No. 2018-215803, filed in Japan on Nov. 16, 2018, the entire contents of which are hereby incorporated herein by reference.

BACKGROUND

The present invention relates to a work vehicle and a control method for a work vehicle.

Background Information

A controller in a work vehicle, such as a bulldozer, controls the rotation speed of the engine and the displacement of a hydraulic pump. For example, in the work vehicle of International Publication No. WO 2010-070962, a fuel adjustment lever is provided for setting the rotation speed of the engine to a high idling rotation speed or to an optional rotation speed equal to or less than the high idling rotation speed. The controller controls the engine in accordance with the engine torque properties set with the fuel adjustment lever. In addition, the controller controls the displacement of a hydraulic pump.

In the work vehicle of International Publication No. WO 2010-070962, the rotation speed of the engine is set to a partial rotation speed which is lower than the high idling rotation speed when the vehicle speed set with a shift button is in a low/medium speed region. As a result, the engine is controlled at a low rotation speed.

Summary

While an improvement in fuel consumption is expected when the engine is controlled at a low rotation speed, there is a conceal that operability is reduced. For example, the load applied to the work vehicle is different when traveling while working with a work implement and the traveling without working with the work implement even when a work vehicle is traveling at the same low speed. When a large load is applied to the work vehicle, there is a concern that the output horsepower of the engine is insufficient and operability is reduced when the engine is controlled at an excessively low rotation speed.

An object of the present invention is to suppress a reduction in operability while improving fuel consumption by controlling the engine at a low rotation speed in a work vehicle.

A first aspect is a work vehicle and the work vehicle comprises an engine, a hydraulic pump, a hydraulic motor, and a controller. The hydraulic pump is driven by the engine. The hydraulic motor is driven by hydraulic fluid discharged from the hydraulic pump to travel the vehicle. The controller controls the rotation speed of the engine and the displacement of the hydraulic pump. The controller acquires the tractive force of the vehicle. The controller changes the rotation speed of the engine to the low speed side in accordance with a reduction in the tractive force.

A second aspect is a method for controlling a work vehicle. The work vehicle comprises an engine, a hydraulic pump driven by the engine, and a hydraulic motor that is driven by hydraulic fluid discharged from the hydraulic pump to travel the vehicle. The method includes the following processes. A first process is acquiring the tractive force of the vehicle. A second process is controlling the rotation speed of the engine and the displacement of the hydraulic pump. A third process is changing the rotation speed of the engine to the low speed side in accordance with a reduction in the tractive force.

According to the present invention, it is possible to suppress a reduction in operability while improving fuel consumption by controlling the engine at a low rotation speed in a work vehicle.

DETAILED DESCRIPTION OF EMBODIMENTS

Figure 1:
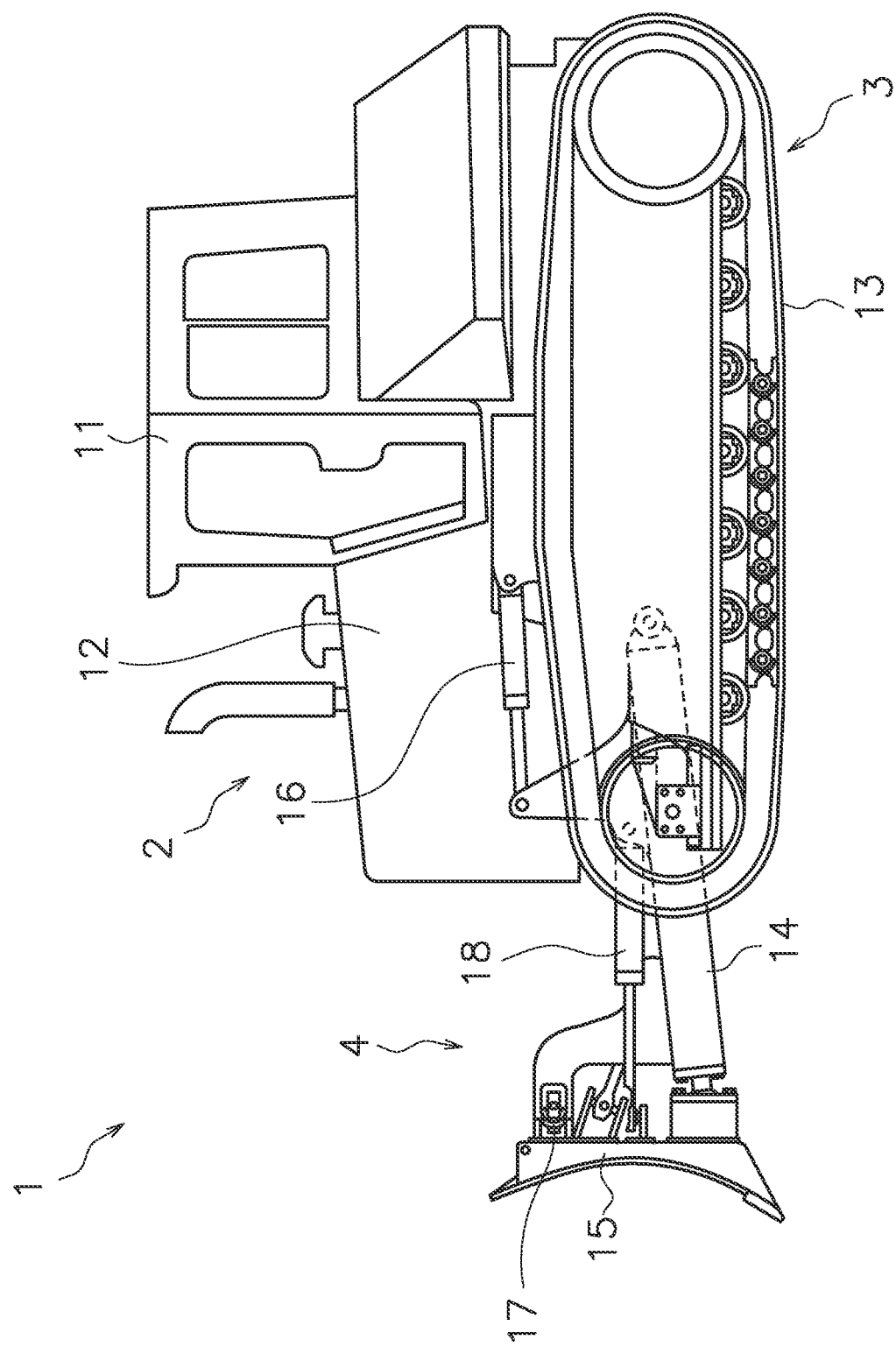
FIG. 1 is a side view of a work vehicle.

The following is a description of a work vehicle 1 according to an embodiment with reference to the drawings. FIG. 1 is a side view of the work vehicle 1. The work vehicle 1 is a bulldozer according to the present embodiment. The work vehicle 1 includes a vehicle body 2, a travel device 3, and a work implement 4. The vehicle body 2 includes an operator's cab 11 and an engine room 12. The engine room 12 is disposed in front of the operator's cab 11. The travel device 3 is attached to a bottom portion of the vehicle body 2. The travel device 3 includes a pair of left and right crawler belts 13. Only the crawler belt 13 on the left side is illustrated in FIG. 1. The work vehicle 1 travels due to the rotation of the crawler belts 13.

The work implement 4 is attached to the vehicle body 2. The work implement 4 has a lift frame 14 and a blade 15. The lift frame 14 is attached to the vehicle body 2 in a manner that allows movement up and down. The lift frame 14 supports the blade 15. The blade 15 is disposed in front of the vehicle body 2. The work vehicle 1 includes a lift cylinder 16, a tilt cylinder 17, and an angle cylinder 18. The lift cylinder 16, the tilt cylinder 17, and the angle cylinder 18 are connected to the work implement 4.

Specifically, the lift cylinder 16 is coupled to the vehicle body 2 and the lift frame 14. The blade 15 moves up and down (referred to below as "lifting motion") due to the extension and contraction of the lift cylinder 16. The tilt cylinder 17 is coupled to the lift frame 14 and the blade 15. The left and right ends of the blade 15 move up and down and the blade 15 tilts (referred to below as "tilting motion") due to the extension and contraction of the tilt cylinders 17. The angle cylinder 18 is coupled to the lift frame 14 and the blade 15. The left and right ends of the blade 15 move forward and backward and the blade 15 tilts (referred to below as "angling motion") due to the extension and contraction of the angle cylinder 18.

Figure 2:
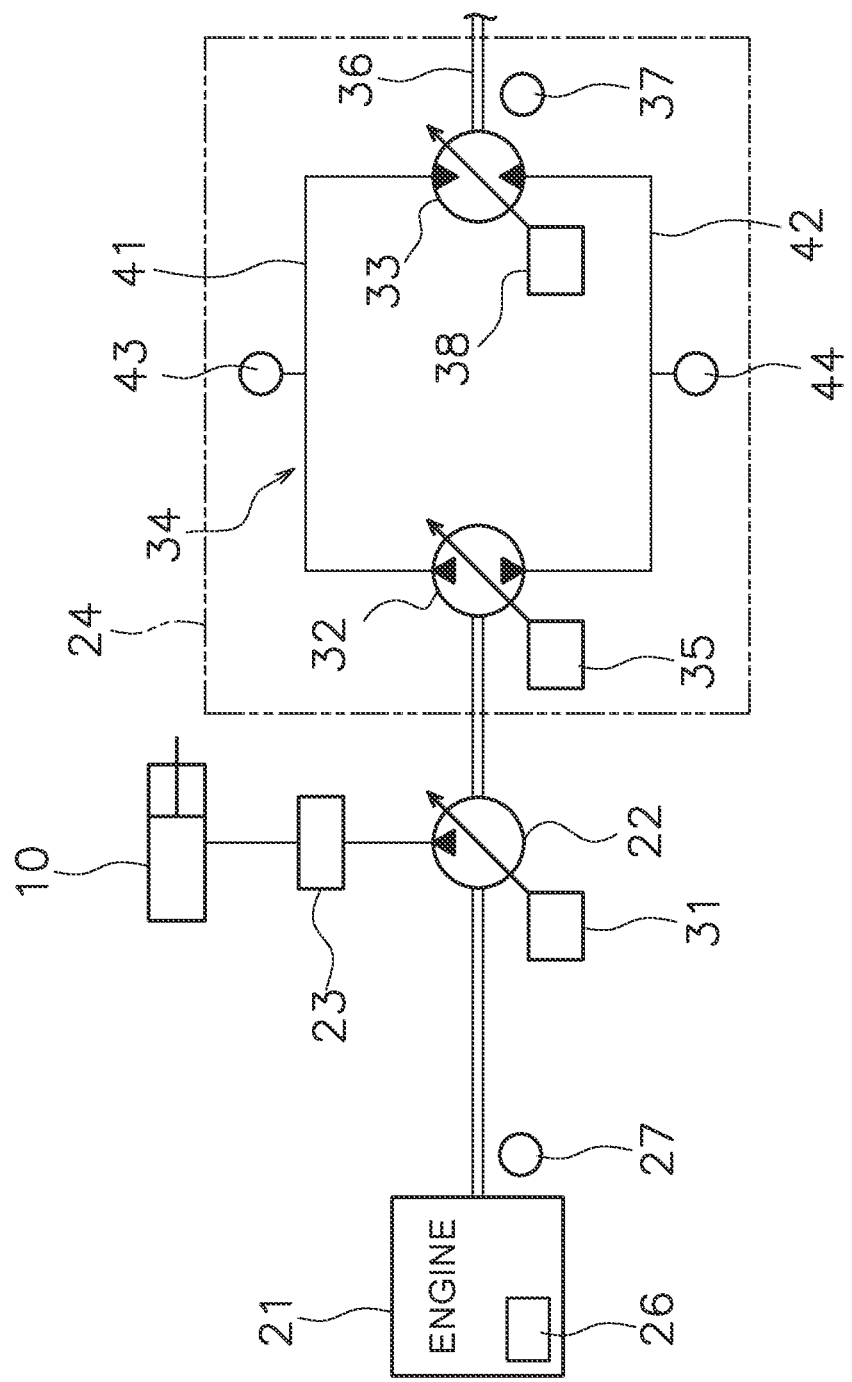
FIG. 2 is a block diagram illustrating a configuration of the work vehicle including a hydrostatic transmission.
Figure 3:
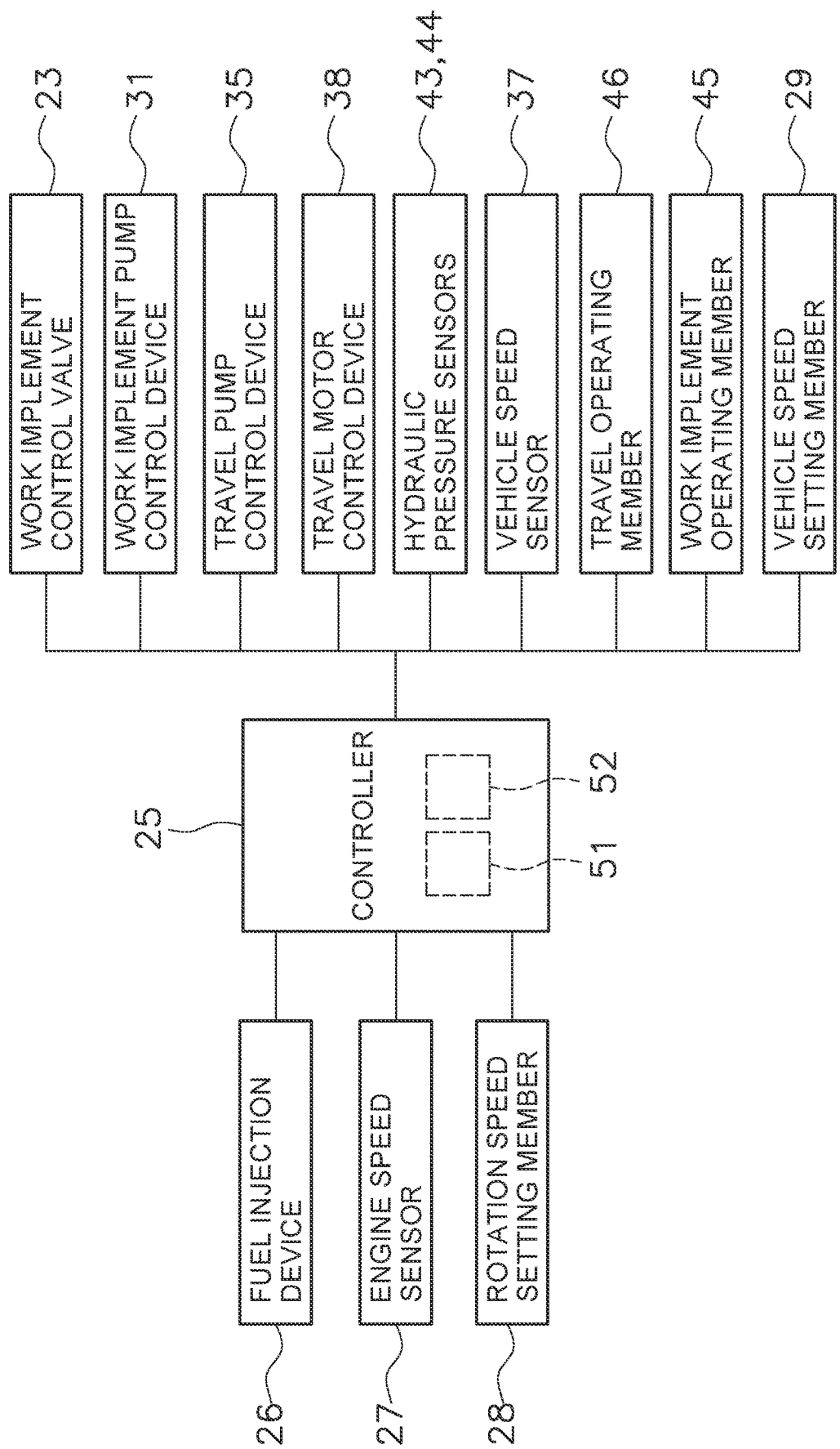
FIG. 3 is a block diagram illustrating a configuration of the work vehicle including a controller for controlling the work vehicle.

FIG. 2 and FIG. 3 are block diagrams of a configuration of the work vehicle 1. As illustrated in FIGS. 2 and 3, the work vehicle 1 includes an engine 21, a work implement pump 22, a work implement control valve 23, a hydrostatic transmission (HST) 24, and a controller 25.

The engine 21 is an internal combustion engine such as a diesel engine. The engine 21 is connected to a fuel injection device 26. The output of the engine 21 is controlled by adjusting the injection amount of fuel from the fuel injection device 26. The adjustment of the fuel injection amount is performed by the fuel injection device 26 which is controlled by controller 25. The rotation speed of the engine 21 is detected by an engine speed sensor 27. The engine speed sensor 27 transmits a detection signal indicative of the rotation speed of the engine 21 to the controller 25.

The work implement pump 22 is a variable displacement hydraulic pump. The work implement pump 22 is connected to the engine 21. The work implement pump 22 is driven by the engine 21 and discharges hydraulic fluid. The hydraulic fluid discharged from the work implement pump 22 is supplied to hydraulic actuators 10 through the work implement control valve 23. The hydraulic actuators 10 include the above-mentioned lift cylinder 16, the tilt cylinder 17, and the angle cylinder 18, and are driven by the hydraulic fluid discharged from the work implement pump 22.

The work implement pump 22 is connected to a work implement pump control device 31. The work implement pump control device 31 controls the displacement of the work implement pump 22 in accordance with an instruction signal from the controller 25. The work implement pump control device 31 varies the displacement of the work implement pump 22 by varying the tilt angle of the work implement pump 22. The work implement pump control device 31 includes, for example, a servo piston and a control valve. The servo piston moves due to hydraulic fluid supplied by the control valve whereby the tilt angle of the work implement pump 22 is varied. Here, displacement signifies the discharge amount of hydraulic fluid per one rotation of the pump.

The work implement control valve 23 is connected to the hydraulic actuators 10 and the work implement pump 22 through a hydraulic circuit. The hydraulic fluid discharged from the work implement pump 22 is supplied to the hydraulic actuators 10 through the work implement control valve 23. The work implement control valve 23 controls the flow rate of the hydraulic fluid supplied to the hydraulic actuators 10 from the work implement pump 22 in accordance with an instruction signal from the controller 25. The work implement control valve 23 may be controlled by supplying a pilot hydraulic pressure.

The HST 24 transmits the driving power of the engine 21 to the travel device 3. The HST 24 includes a travel pump 32, a travel motor 33, and a drive hydraulic circuit 34. The travel pump 32 is a variable displacement hydraulic pump. The travel pump 32 is connected to the engine 21. The travel pump 32 is driven by the engine 21 to discharge hydraulic fluid. The travel pump 32 and the travel motor 33 are connected to each other by the drive hydraulic circuit 34. Hydraulic fluid discharged from the travel pump 32 is supplied to the travel motor 33 through the drive hydraulic circuit 34.

A travel pump control device 35 is connected to the travel pump 32. The travel pump control device 35 controls the displacement of the travel pump 32 in accordance with an instruction signal from the controller 25. The travel pump control device 35 varies the displacement of the travel pump 32 by varying the tilt angle of the travel pump 32. The travel pump control device 35 includes, for example, a servo piston and a control valve. The servo piston moves due to hydraulic fluid supplied by the control valve whereby the tilt angle of the travel pump 32 is varied.

The travel motor 33 is a hydraulic motor and is driven by hydraulic fluid discharged from the travel pump 32. The travel motor 33 is connected to the above-mentioned travel device 3 by means of a drive shaft 36. The travel motor 33 drives the travel device 3 thereby causing the work vehicle 1 to travel. A vehicle speed sensor 37 is provided to the HST 24. The vehicle speed sensor 37 detects the vehicle speed. The vehicle speed sensor 37 detects the vehicle speed, for example, by detecting the rotation speed of the drive shaft 36. The vehicle speed sensor 37 transmits a detection signal indicative of the vehicle speed to the controller 25.

A travel motor control device 38 is connected to the travel motor 33. The travel motor control device 38 controls the displacement of the travel motor 33 in accordance with an instruction signal from the controller 25. The travel motor control device 38 varies the displacement of the travel motor 33 by varying the tilt angle of the travel motor 33. The travel motor control device 38 includes, for example, a servo piston and a control valve. The servo piston moves due to hydraulic fluid supplied by the control valve whereby the tilt angle of the travel motor 33 is varied.

The drive hydraulic circuit 34 has a first drive circuit 41 and a second drive circuit 42. The travel motor 33 is driven in one direction (for example, the forward travel direction) by supplying hydraulic fluid to the travel motor 33 from the travel pump 32 through the first drive circuit 41. The travel motor 33 is driven in the other direction (for example, the reverse travel direction) by supplying hydraulic fluid to the travel motor 33 from the travel pump 32 through the second drive circuit 42.

Hydraulic pressure sensors 43 and 44 are provided to the drive hydraulic circuit 34. The hydraulic pressure sensors 43 and 44 detect the pressure (referred to below as "HST pressure") of the hydraulic fluid supplied to the travel motor 33 through the first drive circuit 41 or the second drive circuit 42. The hydraulic pressure sensors 43 and 44 transmit detection signals indicative of the HST pressure to the controller 25. As described below, the controller 25 calculates the tractive force of the work vehicle 1 from the HST pressure detected by the hydraulic pressure sensors 43 and 44 and from the displacement of the travel motor 33. Therefore, the hydraulic pressure sensors 43 and 44 each correspond to a sensor for detecting the tractive force of the work vehicle 1.

As illustrated in FIG. 3, the work vehicle 1 includes a work implement operating member 45 and a travel operating member 46. The work implement operating member 45 and the travel operating member 46 are disposed in the operator's cab 11. The work implement operating member 45 is, for example, a work implement lever and is a member for operating the work implement 4. The work implement operating member 45 can be operated manually between the operating positions for the lifting motion, the tilting motion, and the angling motion of the blade 15. The work implement operating member 45 receives an operation from the operator for driving the work implement 4 and outputs an operation signal corresponding to the operation.

The travel operating member 46 is, for example, a travel lever and is a member for operating the travel device 3. The travel operating member 46 can be operated manually between a forward travel position, a reverse travel position, and a neutral position. The travel operating member 46 receives an operation from the operator for driving the work vehicle 1 and outputs an operation signal corresponding to the operation. The operation signal of the work implement operating member 45 and the operation signal of the travel operating member 46 are outputted to the controller 25. The work implement operating member 45 and the travel operating member 46 are not limited to levers, and may be other members, such as a pedal or a switch.

The work vehicle 1 includes a rotation speed setting member 28. The rotation speed setting member 28 is disposed in the operator's cab 11. The rotation speed setting member 28 is a member for setting a target rotation speed of the engine 21. The rotation speed setting member 28 is, for example, a dial-shaped member and is configured to be manually operated. However, the rotation speed setting member 28 may be another member, such as a lever, a pedal, or a switch. The rotation speed setting member 28 transmits an operation signal indicative of an operating amount of the rotation speed setting member 28 to the controller 25. The controller 25 sets the target rotation speed in accordance with the operating amount of the rotation speed setting member 28. For example, the operating amount is indicated by a ratio with respect to the maximum operating amount.

The work vehicle 1 includes a vehicle speed setting member 29. The vehicle speed setting member 29 is disposed in the operator's cab 11. The vehicle speed setting member 29 is a member for setting a set vehicle speed of the work vehicle 1. The set vehicle speed signifies a vehicle speed when there is no load. In other words, the set vehicle speed corresponds to the maximum vehicle speed in the speed change level set with the vehicle speed setting member 29. The vehicle speed setting member 29 includes, for example, a shift-up button and a shift-down button and is configured to be manually operated. The set vehicle speed is increased by pressing the shift-up button and the set vehicle speed is decreased by pressing the shift-down button. However, the vehicle speed setting member 29 may be another member, such as a lever, a pedal, or a switch. The controller 25 determines the set vehicle speed in accordance with the operation of the vehicle speed setting member 29.

The controller 25 is programmed to control the work vehicle 1 based on acquired data. The controller 25 includes a processor 51 and a memory 52. The processor 51 is, for example, a CPU and executes processing for controlling the engine 21. The memory 52 includes, for example, a volatile memory and a non-volatile memory. The memory 52 records computer commands that can be executed by the processor 51 and that are for controlling the engine 21. The controller 25 may be configured by a plurality of controllers. For example, the controller 25 may include a controller for the engine 21 and a controller for the pumps 22 and 32.

The controller 25 acquires operation signals from the work implement operating member 45 and the travel operating member 46. The controller 25 controls the work implement control valve 23 in accordance with the operation signals from the work implement operating member 45 to move the work implement 4. The controller 25 controls the engine 21 and the HST 24 in accordance with the operation signals from the travel operating member 46 to travel the work vehicle 1. The controller 25 controls the fuel injection device 26 to control the output torque and the rotation speed of the engine 21. The controller 25 controls the travel pump control device 35 to control the displacement of the travel pump 32. The controller 25 controls the travel motor control device 38 to control the displacement of the travel motor 33.

The work implement operating member 45 and the travel operating member 46 are not limited to outputting electrical operation signals and may output pilot hydraulic pressures that correspond to the operations. In this case, the controller 25 may detect the pilot hydraulic pressures from the work implement operating member 45 and the travel operating member 46 with a hydraulic pressure sensor and acquire operation signals indicative of the pilot hydraulic pressures.

The controller 25 controls the rotation speed of the engine 21 and the displacement of the travel pump 32 so that the output torque of the engine 21 and the absorption torque of the travel pump 32 match each other. The control of the rotation speed of the engine 21 and the displacement of the travel pump 32 by the controller 25 includes a normal matching control and a variable matching control.

In the nominal matching control, the controller 25 controls the fuel injection amount of the engine 21 in accordance with the load so that the rotation speed of the engine 21 is maintained at the target rotation speed set with the rotation speed setting member 28. The controller 25 increases and decreases the fuel injection amount so that the difference between the target rotation speed and the actual rotation speed of the engine 21 is reduced. The following discussion pertains to the normal matching control.

Figure 4:
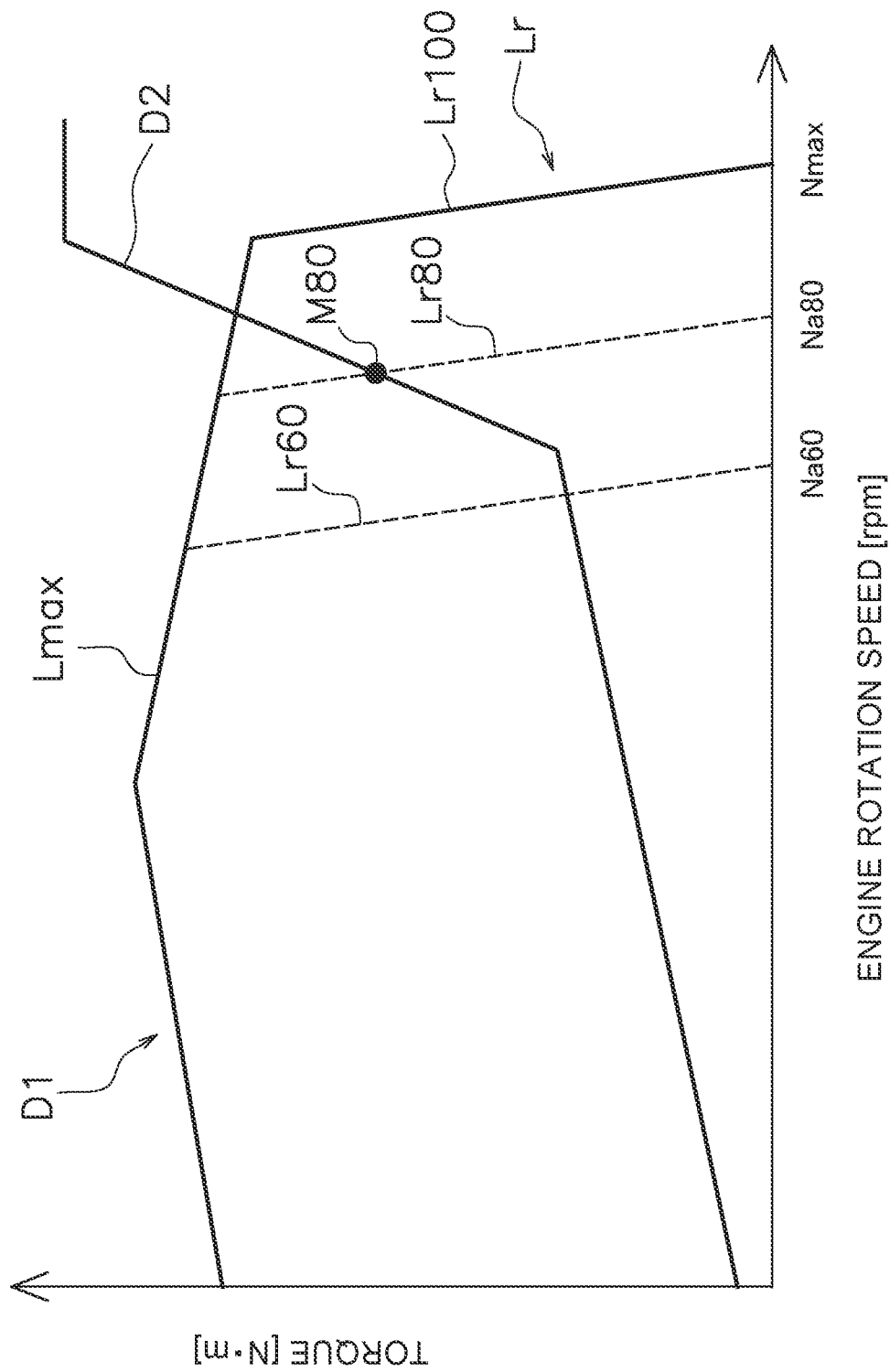
FIG. 4 illustrates an example of engine torque properties during a normal matching control.

FIG. 4 illustrates an example of engine torque properties D1 during the nominal matching control. The engine torque properties D1 are digitalized and stored by the controller 25. The engine torque properties D1 include a maximum torque line Lmax and a regulation line Lr. The region indicated by the maximum torque line Lmax indicates the relationship between the rotation speed of the engine 21 and the upper limit of the torque that can be outputted by the engine 21 at each rotation speed.

The regulation line Lr is determined in accordance with the target rotation speed set with the rotation speed setting member 28. In FIG. 4, Lr100 indicates the regulation line Lr when the operating amount of the rotation speed setting member 28 is the maximum operating amount (100%). The target rotation speed is a high idling rotation speed Nmax at the regulation line Lr100.

The controller 25 changes the regulation line to the low speed side as the target rotation speed set with the rotation speed setting member 28 becomes smaller. For example, Lr80 in FIG. 4 indicates the regulation line Lr when the operating amount of the rotation speed setting member 28 is a first operating amount (for example, 80%). The target rotation speed is a first rotation speed Na80 that is smaller than the high idling rotation speed Nmax at the regulation line Lr80. Lr60 indicates the regulation line Lr when the operating amount of the rotation speed setting member 28 is a second operating amount (for example, 60%). The target rotation speed is a second rotation speed Na60 that is smaller than the first rotation speed Na80 at the regulation line Lr60.

The controller 25 controls the engine 21 so that the rotation speed of the engine 21 changes on the regulation line in accordance with the load on the engine 21. The load on the engine 21 signifies the load from the travel pump 32. The travel pump 32 is configured so that the absorption torque changes in accordance with the rotation speed of the engine 21 according to a pump absorption torque line D2 illustrated in FIG. 4. The pump absorption torque line D2 defines the relationship between the rotation speed of the engine 21 and the absorption torque of the travel pump 32. The pump absorption torque line D2 is digitalized and stored by the controller 25. The controller 25 controls the engine 21 and the travel pump 32 so that the output torque of the engine 21 and the absorption torque of the travel pump 32 match each other on the engine torque properties D1.

The controller 25 determines a target absorption torque of the travel pump 32 so that the absorption torque of the travel pump 32 is in balance with the output torque of the engine 21 at the matching point where the engine torque properties D1 and the pump absorption torque line D2 intersect. For example, as illustrated in FIG. 4, the target absorption torque of the travel pump 32 is determined so that the absorption torque of the travel pump 32 is in balance with the output torque of the engine 21 at the matching point M80 where the regulation line Lr80 and the pump absorption torque line D2 intersect when the target rotation speed is the first rotation speed Na80.

Figure 5:
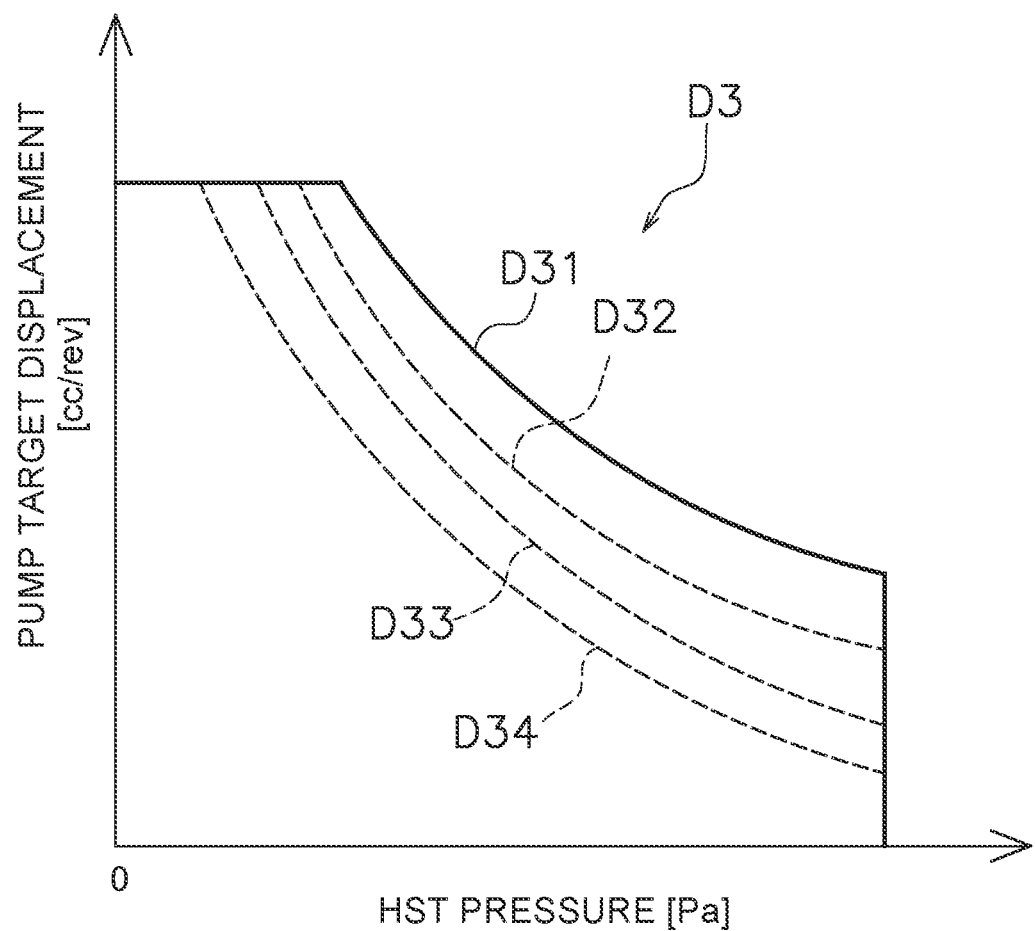
FIG. 5 illustrates an example of displacement properties of a travel pump.

The controller 25 determines a target displacement of the travel pump 32 from the target absorption torque and the HST pressure. FIG. 5 illustrates an example of displacement properties D3 of the travel pump 32. The displacement properties D3 of the travel pump 32 are digitalized and stored by the controller 25. The displacement properties D3 of the travel pump 32 may be represented, for example, in the form of a formula. Alternatively, the displacement properties D3 of the travel pump 32 may be represented by another form such as a table or a map. Other properties and data may also be represented in the same way.

The displacement properties D3 of the travel pump 32 define the relationship between the target absorption torque, the HST pressure, and the target displacement of the travel pump 32. As illustrated in FIG. 5, the displacement properties D3 of the travel pump 32 change from a displacement properties line D31 toward a displacement properties line D34 as the target absorption torque becomes smaller. In the displacement properties D3 of the travel pump 32, the product of the HST pressure and the target displacement of the travel pump 32 decreases as the target absorption torque becomes smaller. In other words, in the displacement properties D3 of the travel pump 32, if the target absorption torque is fixed, the target displacement of the travel pump 32 decreases as the HST pressure increases. The controller 25 determines the target displacement of the travel pump 32 from the target absorption torque and the HST pressure by referring to the displacement properties D3 of the travel pump 32. The controller 25 transmits an instruction signal corresponding to the target displacement of the travel pump 32 to the travel pump control device 35. Consequently, the travel pump 32 is controlled so that the displacement of the travel pump 32 becomes the target displacement.

Figure 6:
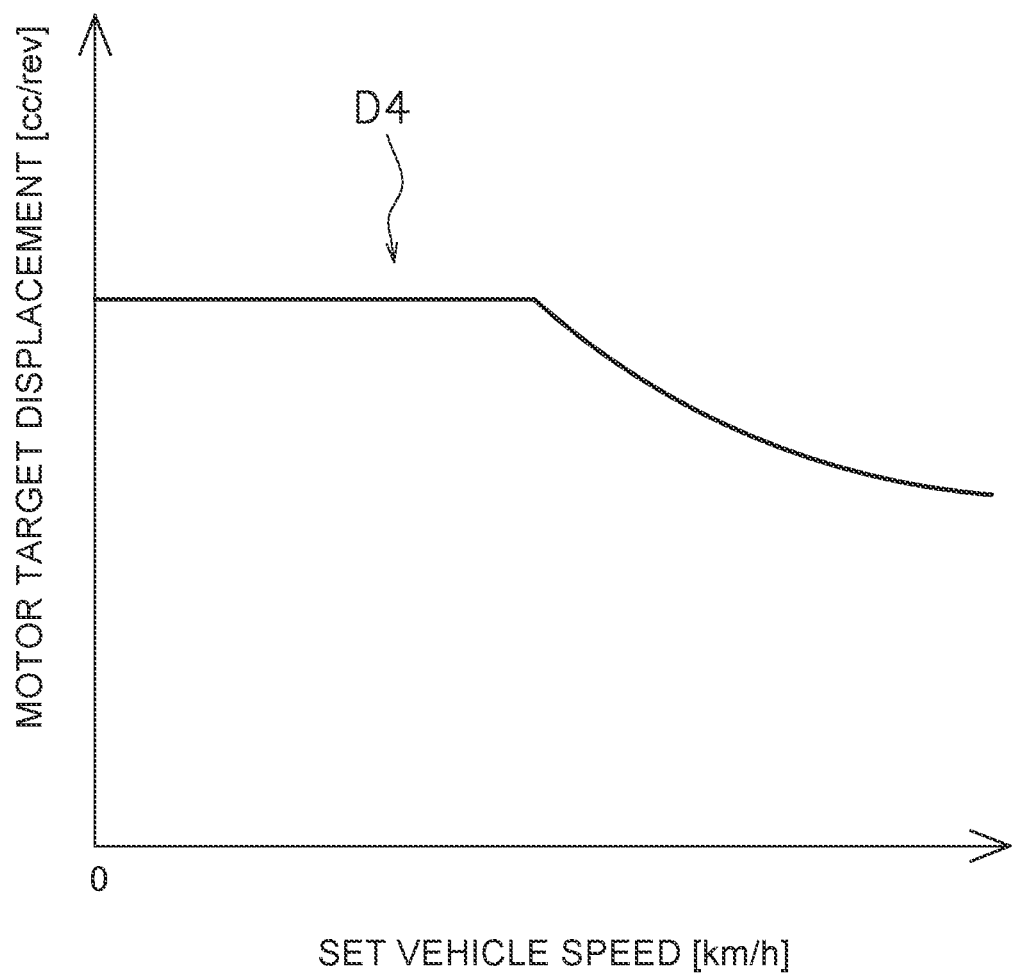
FIG. 6 illustrates an example of displacement properties of a travel motor.

The controller 25 determines a target displacement of the travel motor 33 from the set vehicle speed by referring to displacement properties D4 of the travel motor 33. FIG. 6 illustrates an example of the displacement properties D4 of the travel motor 33. The displacement properties D4 of the travel motor 33 define the relationship between the target displacement of the travel motor 33 and the set vehicle speed. The displacement properties D4 of the travel motor 33 are digitalized and stored by the controller 25.

The controller 25 also determines the target displacement of the travel motor 33 so that the HST pressure becomes a predetermined target pressure. The controller 25 determines the target displacement of the travel motor 33 so that the HST pressure becomes the target pressure through feedback control. The controller 25 determines the larger of the target displacement determined from the set vehicle speed and the target displacement determined so that the HST pressure becomes the target pressure, as an instruction target displacement for the travel motor 33. The controller 25 transmits an instruction signal corresponding to the instruction target displacement to the travel motor control device 38. Consequently, the travel motor 33 is controlled so that the displacement of the travel motor 33 becomes the instruction target displacement.

Figure 7:
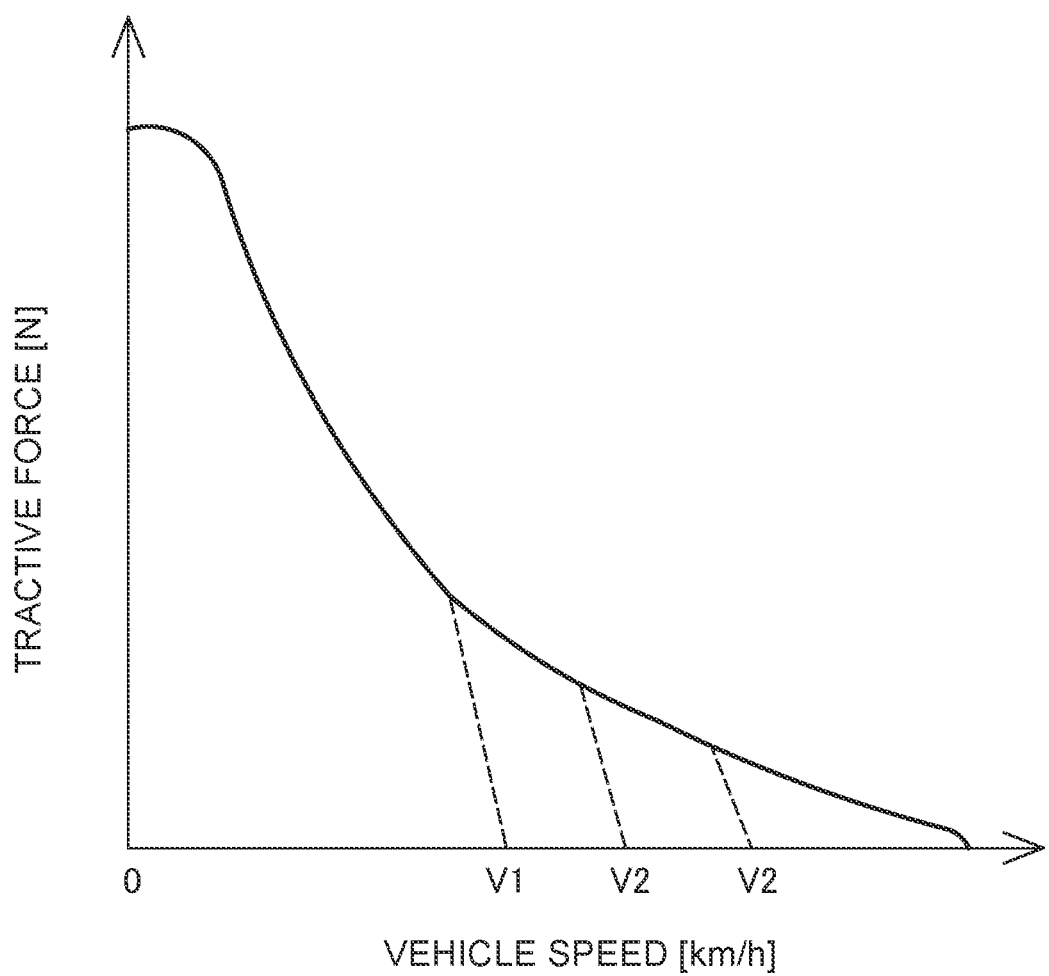
FIG. 7 illustrates an example of tractive force-vehicle speed properties.

As described above, the engine 21, the travel pump 32, and the travel motor 33 are controlled whereby tractive force-vehicle speed properties are obtained in which the tractive force and the vehicle speed change continuously in the work vehicle 1 as illustrated, for example, in FIG. 7. V1, V2, and V3 in FIG. 7 represent examples of set vehicle speeds set with the vehicle speed setting member 29.

Figure 8:
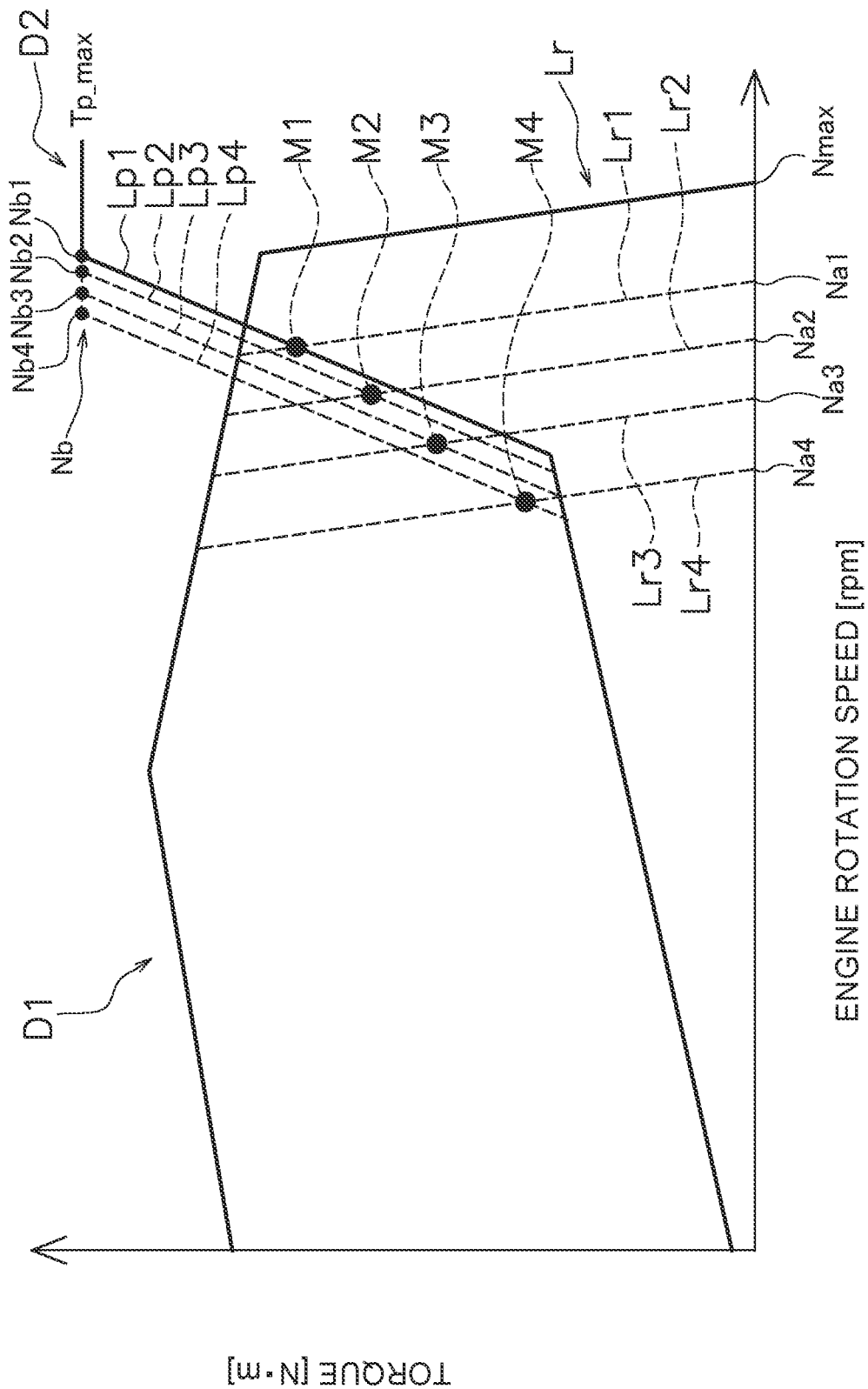
FIG. 8 illustrates an example of engine torque properties during a variable matching control.

The following is an explanation of the variable matching control. In the variable matching control, the controller 25 changes the matching point of the output torque of the engine 21 and the absorption torque of the travel pump 32, to the low speed side of the rotation speed of the engine 21 in response to a reduction in the tractive force. FIG. 8 illustrates an example of the engine torque properties D1 during the variable matching control.

As illustrated in FIG. 8 for example, the controller 25 varies the matching point from M1 toward M4 in response to a reduction in the tractive force. The controller 25 controls the rotation speed of the engine 21 and the displacement of the travel pump 32 so that the matching points M1 to M4 change to the low speed side and the low torque side of the rotation speed of the engine 21 in response to a reduction in the tractive force. Specifically, the controller 25 changes the matching points by varying the regulation line Lr of the engine torque properties D1 and the pump absorption torque line D2 in response to the tractive force.

Figure 9:
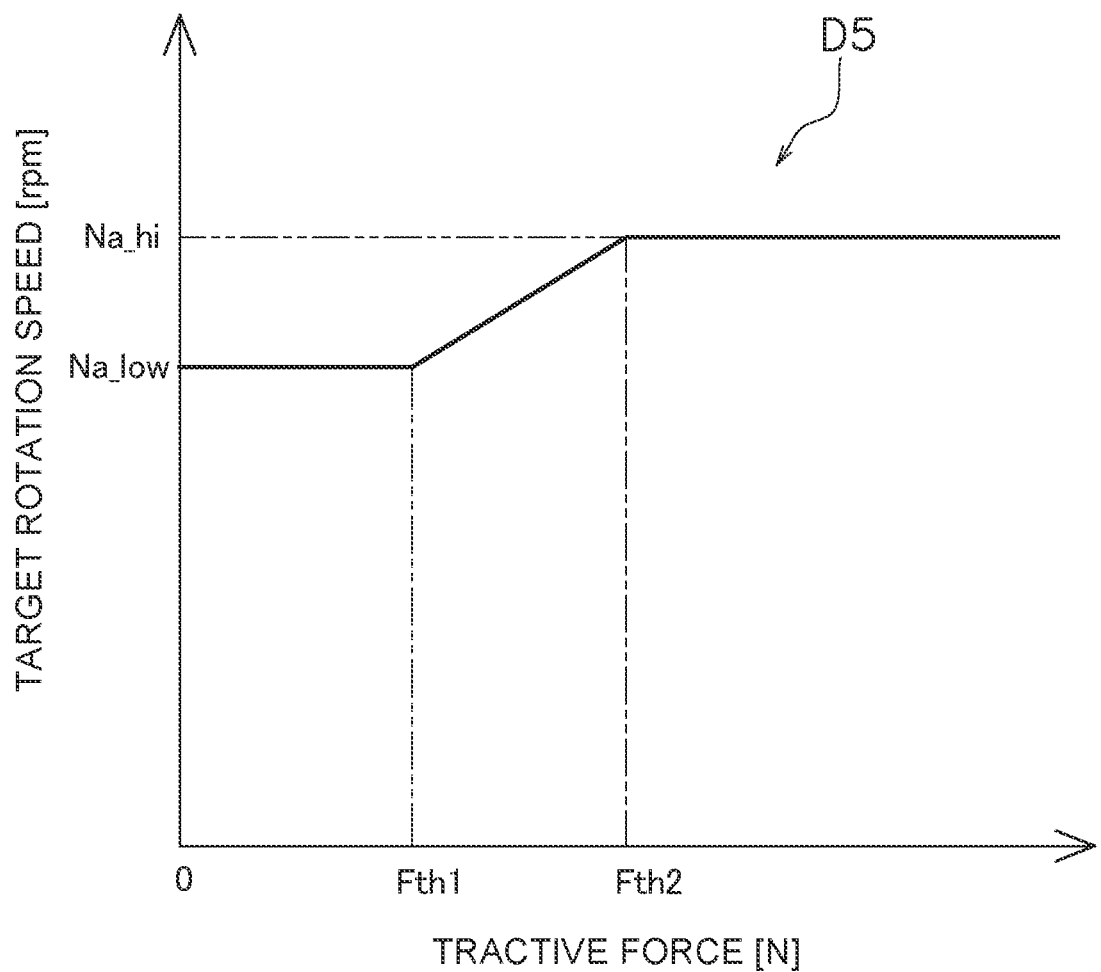
FIG. 9 illustrates an example of rotation speed-tractive force data.

FIG. 9 illustrates an example of rotation speed-tractive force data D5 which defines the relationship between the target rotation speed of the engine 21 and the tractive force. The rotation speed-tractive force data D5 is stored by the controller 25. In the rotation speed-tractive force data D5, the target rotation speed decreases in accordance with a reduction of the tractive force at least in a range between a first tractive force threshold Fth1 and a second tractive force threshold Fth2. The second tractive force threshold Fth2 is larger than the first tractive force threshold Fth1. In the rotation speed-tractive force data D5, the target rotation speed is constant at a first upper limit speed Na_hi when the tractive force is greater than the second tractive force threshold Fth2. The first upper limit speed Na_hi is, for example, the high idling rotation speed Nmax. However, the first upper limit speed Na_hi may be a value different from the high idling rotation speed Nmax. In the rotation speed-tractive force data D5, the target rotation speed is constant at a first lower limit speed Na_low when the tractive force is smaller than the first tractive force threshold Fth1. The first lower limit speed Na_low is lower than the first upper limit speed Na_hi.

Figure 10:
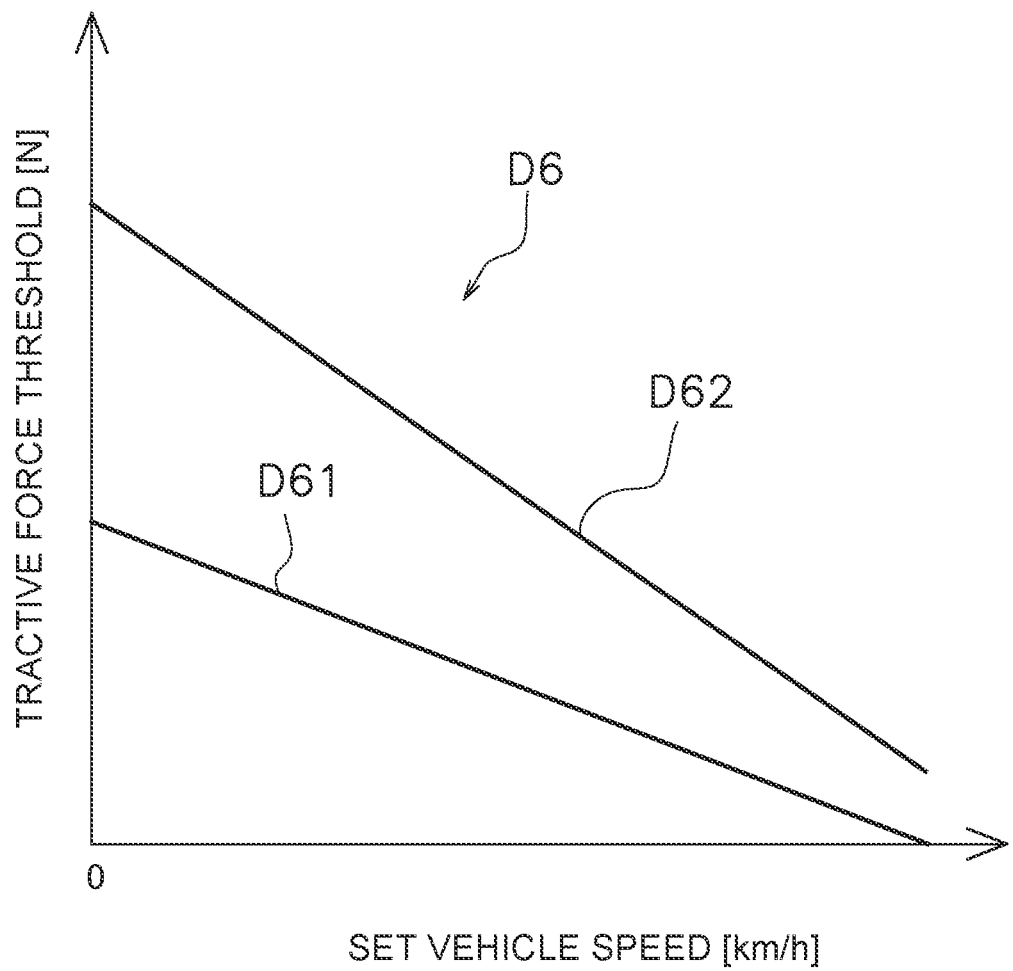
FIG. 10 illustrates an example of tractive force threshold data.

The first tractive force threshold Fth1 and the second tractive force threshold Fth2 change in accordance with the set vehicle speed. That is, the rotation speed-tractive force data D5 defines the relationship between the target rotation speed and the tractive force that change in accordance with the set vehicle speed. FIG. 10 illustrates an example of tractive force threshold data D6 which defines the relationship between the first tractive force threshold Fth1 and the second tractive force threshold Fth2, and the set vehicle speed. As illustrated in FIG. 10, the tractive force threshold data D6 includes first tractive force threshold data D61 and second tractive force threshold data D62. The first tractive force threshold data D61 defines the relationship between the first tractive force threshold Fth1 and the set vehicle speed. The second tractive force threshold data D62 defines the relationship between the second tractive force threshold Fth2 and the set vehicle speed. In the first tractive force threshold data D61, the first tractive force threshold Fth1 decreases in accordance with an increase in the set vehicle speed. Moreover, in the second tractive force threshold data D62, the second tractive force threshold Fth2 decreases in accordance with an increase in the set vehicle speed.

The controller 25 determines the first tractive force threshold Fth1 from the set vehicle speed by referring to the first tractive force threshold data D61. The controller 25 determines the second tractive force threshold Fth2 from the set vehicle speed by referring to the second tractive force threshold data D62. The controller 25 determines the target rotation speed from the tractive force by referring to the rotation speed-tractive force data D5. The controller 25 calculates the tractive force, for example, from the product of the displacement of the travel motor 33 and the HST pressure.

The controller 25 determines the regulation line Lr based on the target rotation speed. As described above, in the rotation speed-tractive force data D5, the target rotation speed decreases in accordance with a reduction in the tractive force while the tractive force is in the range between the first tractive force threshold Fth1 and the second tractive force threshold Fth2. Therefore, the controller 25 controls the engine 21 so that the regulation line Lr changes to the low rotation speed side in accordance with a reduction in the tractive force when the tractive force is in the range between the first tractive force threshold Fth1 and the second tractive force threshold Fth2.

Figure 11:
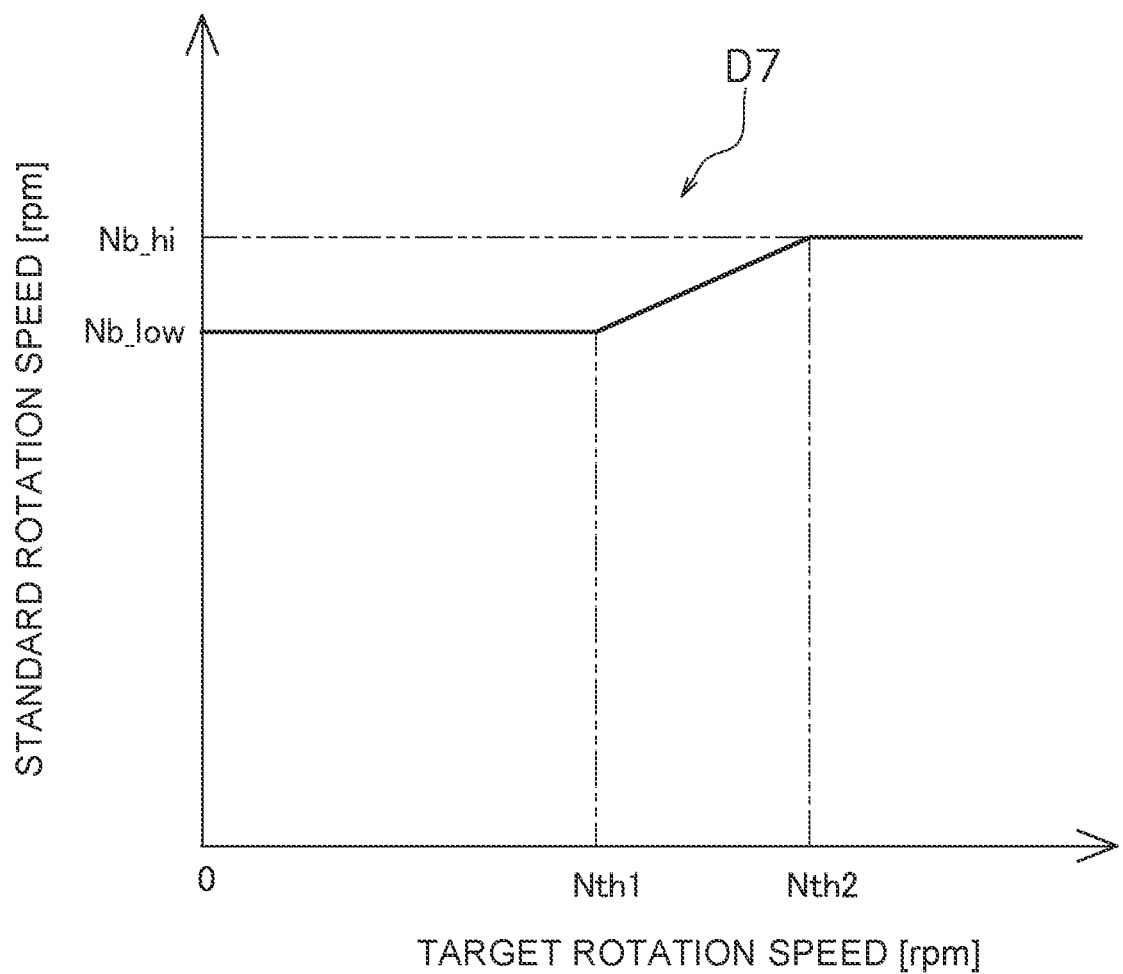
FIG. 11 illustrates an example of pump rotation speed data.

FIG. 11 illustrates an example of pump rotation speed data D7 which defines the relationship between a standard rotation speed and the target rotation speed. As illustrated in FIG. 8, a standard rotation speed Nb is the rotation speed of the engine 21 when the absorption torque of the travel pump 32 reaches an upper limit Tp_max on the pump absorption torque line D2. In the pump absorption torque line D2, the absorption torque of the travel pump 32 is constant at the upper limit Tp_max when the rotation speed of the engine 21 is equal to or greater than the standard rotation speed Nb. In the pump absorption torque line D2, the absorption torque of the travel pump 32 decreases in accordance with a reduction in the rotation speed of the engine 21 when the rotation speed of the engine 21 is less than the standard rotation speed Nb.

As illustrated in FIG. 11, in the pump rotation speed data D7, the standard rotation speed Nb decreases in accordance with a reduction in the target rotation speed when the target rotation speed of the engine 21 is at least in the range between a first speed threshold Nth1 and a second speed threshold Nth2. The second speed threshold Nth2 is greater than the first speed threshold Nth1. In the pump rotation speed data D7, the standard rotation speed Nb is constant at a second upper limit speed Nb_hi when the target rotation speed is greater than the second speed threshold Nth2. The second upper limit speed Nb_hi is, for example, the high idling rotation speed Nmax. However, the second upper limit speed Nb_hi may be a value different from the high idling rotation speed Nmax. In the pump rotation speed data D7, the standard rotation speed Nb is constant at a second lower limit speed Nb_low when the target rotation speed is less than the first speed threshold Nth1. The second lower limit speed Nb_low is smaller than the second upper limit speed Nb_hi.

The controller 25 determines the standard rotation speed Nb from the target rotation speed by referring to the pump rotation speed data D7. In the pump absorption torque line D2, the absorption torque is the upper limit Tp_max at the standard rotation speed Nb, and the absorption torque decreases by a predetermined ratio in accordance with a reduction in the rotation speed while the rotation speed is less than the standard rotation speed Nb. Therefore, the controller 25 determines the standard rotation speed Nb, thereby determining the pump absorption torque line D2. As described above, the standard rotation speed Nb decreases in accordance with a reduction in the target rotation speed when the target rotation speed of the engine 21 is at least in the range between the first speed threshold Nth1 and the second speed threshold Nth2. Therefore, the controller 25 changes the standard rotation speed Nb to the low speed side in accordance with a reduction in the target rotation speed. As a result, the controller 25 controls the displacement of the travel pump 32 so that the pump absorption torque line D2 changes to the low speed side of the rotation speed of the engine 21 in accordance with a reduction in the target rotation speed.

The controller 25 determines the intersection of the pump absorption torque line D2 determined as indicated above and the regulation line Lr as the matching point. The controller 25 then controls the rotation speed of the engine 21 and the displacement of the travel pump 32 so that the output torque of the engine 21 and the absorption torque of the travel pump 32 are in balance at the matching point.

For example in FIG. 8, the controller 25 determines the target rotation speed as Na1 and determines a regulation line Lr1 from the target rotation speed Na1 when the tractive force is a certain value. The controller 25 also determines a standard rotation speed Nb1 from the target rotation speed Na1 and determines a pump absorption torque line Lp1 from the standard rotation speed Nb1. The controller 25 then determines the intersection of the regulation line Lr1 and the pump absorption torque line Lp1 as the matching point M1. The controller 25 controls the rotation speed of the engine 21 and the displacement of the travel pump 32 so that the output torque of the engine 21 and the absorption torque of the travel pump 32 are in balance at the matching point M1. The method for determining the displacement of the travel pump 32 is the same as the above-mentioned nominal matching control.

When the tractive force decreases, the controller 25 reduces the target rotation speed sequentially from Na1, through Na2 and Na3, to Na4. Consequently, the controller 25 changes the regulation line from Lr1, through Lr2 and Lr3 to Lr4. In addition, the controller 25 changes the standard rotation speed Nb of the pump absorption torque line D2 from Nb1, through Nb2 and Nb3, to Nb4 in accordance with the reduction in the standard rotation speed. Consequently, the controller 25 changes the pump absorption torque line D2 from Lp1, through Lp2 and Lp3, to Lp4. As a result, the matching point changes from M1, through M2 and M3, to M4.

The controller 25 selectively executes the above-mentioned nominal matching control and the variable matching control. The controller 25 controls the engine 21 and the travel pump 32 under the variable matching control when the target rotation speed (referred to below as "first target rotation speed") of the engine 21 determined under the variable matching control is less than the target rotation speed (referred to below as "second target rotation speed") set with the rotation speed setting member 28. The controller 25 controls the engine 21 and the travel pump 32 under the normal matching control when the second target rotation speed is equal to or less than the first target rotation speed. Therefore, the controller 25 determines the smaller of the first target rotation speed and the second target rotation speed as the target rotation speed of the engine 21.

In the work vehicle 1 according to present embodiment explained above, the controller 25 changes the matching point of the output torque of the engine 21 and the absorption torque of the travel pump 32, to the low speed side of the rotation speed and the low torque side of the engine 21 in response to a reduction in the tractive force. Therefore, the controller 25 is able to change the matching point to the low speed side of the rotation speed of the engine 21 when the load applied to the work vehicle 1 is small. Consequently, a reduction in operability can be suppressed while improving fuel consumption.

The rotation speed-tractive force data D5 defines the relationship between the target rotation speed and the tractive force that change in accordance with the set vehicle speed. Consequently, a suitable target rotation speed can be set in accordance with the set vehicle speed and the tractive force.

The controller 25 determines the smaller of the first target rotation speed and the second target rotation speed as the target rotation speed of the engine 21. Therefore, the first target rotation speed is determined as the target rotation speed when the first target rotation speed determined under the variable matching control is smaller than the second target rotation speed set by the operator. Accordingly, fuel consumption can be improved. In addition, the second target rotation speed is determined as the target rotation speed when the second target rotation speed set by the operator is less than the first target rotation speed determined under the variable matching control. Accordingly, an output of the engine 21 can be obtained that coincides with the intentions of the operator.

Although an embodiment of the present invention has been described so far, the present invention is not limited to the above embodiment and various modifications may be made within the scope of the invention. The work vehicle 1 is not limited to a bulldozer and may be another vehicle, such as a hydraulic excavator, a wheel loader, or a motor grader or the like. The travel device 3 is not limited to crawler belts and may include other members, such as tires. The work implement 4 is not limited to a blade and may include another member, such as a bucket.

The hydraulic actuators are not limited to the above-mentioned lift cylinder, tilt cylinder, and angle cylinder, and may include other actuators. The configuration of the HST is not limited to the above embodiment and may be modified. For example, the HST may have a plurality of travel motors. The HST may also have a plurality of travel pumps.

The methods for determining the target rotation speed of the engine, the target displacement of the travel pump, or the target displacement of the travel motor are not limited to the ones described in the above embodiment and may be modified. The engine torque properties, the tractive force-vehicle speed properties, the pump absorption torque line, and the displacement properties of the travel pump 32 are not limited to the ones described in the above embodiment and may be modified. The rotation speed-tractive force data, the first tractive force threshold data, and the pump rotation speed data are not limited to the ones described in the above embodiment and may be modified.

According to the present invention, it is possible to suppress a reduction in operability while improving fuel consumption by controlling the engine at a low rotation speed in a work vehicle.

The invention claimed is:

1. A work vehicle comprising:
an engine;
a hydraulic pump driven by the engine;
a hydraulic motor driven by hydraulic fluid discharged from the hydraulic pump to travel the work vehicle; and
a controller for controlling a rotation speed of the engine and a displacement of the hydraulic pump,
the controller being configured to
acquire a tractive force of the vehicle; and
reduce the rotation speed of the engine in accordance with a reduction in the tractive force.

2. The work vehicle according to claim 1, wherein
the controller is further configured to
control the rotation speed of the engine and the displacement of the hydraulic pump so that an output torque of the engine and an absorption torque of the hydraulic pump match each other,
acquire the tractive force of the vehicle, and
control the rotation speed of the engine and the displacement of the hydraulic pump under a variable matching control that changes a matching point of the output torque of the engine and the absorption torque of the hydraulic pump in accordance with the reduction in the tractive force.

3. The work vehicle according to claim 2, wherein
the controller is further configured to control the rotation speed of the engine and the displacement of the hydraulic pump under the variable matching control so that the matching point of the output torque of the engine and the absorption torque of the hydraulic pump is changed in accordance with the reduction of the tractive force.

4. The work vehicle according to claim 2, wherein
the controller is further configured to
control the rotation speed of the engine and the output torque of the engine in accordance with a regulation line that defines a relationship between the output torque of the engine and the rotation speed of the engine, and
control the engine so that the regulation line is changed in accordance with the reduction of the tractive force under the variable matching control.

5. The work vehicle according to claim 4, wherein
the regulation line is defined by a target rotation speed of the engine,
the controller has rotation speed-tractive force data that defines a relationship between the target rotation speed and the tractive force, and
the controller is further configured to refer to the rotation speed-tractive force data to determine the target rotation speed from the tractive force under the variable matching control.

6. The work vehicle according to claim 5, wherein
the controller is further configured to acquire a vehicle speed, and
the rotation speed-tractive force data defines the relationship between the target rotation speed that changes in accordance with the vehicle speed, and the tractive force.

7. The work vehicle according to claim 5, further comprising
  a rotation speed setting member configured to be manually operated,
  the controller being further configured to
    refer to the rotation speed-tractive force data to determine a first target rotation speed from the tractive force under the variable matching control,
    acquire a second target rotation speed of the engine set with the rotation speed setting member, and
    determine a smaller of the first target rotation speed and the second target rotation speed as the target rotation speed of the engine.

8. The work vehicle according to claim 5, wherein
the controller is further configured to control the displacement of the hydraulic pump so that the absorption torque changes in accordance with the rotation speed of the engine according to a pump absorption torque line that defines a relationship between the rotation speed of the engine and the absorption torque of the hydraulic pump; and
the controller is further configured to control the displacement of the hydraulic pump so that the pump absorption torque line is changed in accordance with the reduction of the tractive force.

9. The work vehicle according to claim 8, wherein
the controller has pump rotation speed data which defines a relationship between a standard rotation speed, which is the rotation speed of the engine when the absorption torque of the hydraulic pump reaches an upper limit on the pump absorption torque line, and the target rotation speed, and
the controller is further configured to
  refer to the pump rotation speed data to determine the standard rotation speed from the target rotation speed under the variable matching control, and
  control the rotation speed of the engine and the displacement of the hydraulic pump so that the output torque of the engine and the absorption torque of the hydraulic pump match each other at an intersection of the pump absorption torque line defined by the standard rotation speed, and the regulation line.

10. The work vehicle according to claim 3, wherein
the controller is further configured to
  control the rotation speed of the engine and the output torque of the engine in accordance with a regulation line that defines a relationship between the output torque of the engine and the rotation speed of the engine, and
  control the engine so that the regulation line is changed in accordance with the reduction of the tractive force under the variable matching control.

11. The work vehicle according to claim 10, wherein
the regulation line is defined by a target rotation speed of the engine,
the controller has rotation speed-tractive force data that defines a relationship between the target rotation speed and the tractive force, and
the controller is further configured to refer to the rotation speed-tractive force data to determine the target rotation speed from the tractive force under the variable matching control.

12. The work vehicle according to claim 11, wherein
the controller is further configured to acquire a vehicle speed, and
the rotation speed-tractive force data defines the relationship between the target rotation speed that changes in accordance with the vehicle speed, and the tractive force.

13. The work vehicle according to claim 12, further comprising
  a rotation speed setting member configured to be manually operated,
  the controller being further configured to
    refer to the rotation speed-tractive force data to determine a first target rotation speed from the tractive force under the variable matching control,
    acquire a second target rotation speed of the engine set with the rotation speed setting member, and
    determine a smaller of the first target rotation speed and the second target rotation speed as the target rotation speed of the engine.

14. The work vehicle according to claim 13, wherein
the controller is further configured to control the displacement of the hydraulic pump so that the absorption torque changes in accordance with the rotation speed of the engine according to a pump absorption torque line that defines a relationship between the rotation speed of the engine and the absorption torque of the hydraulic pump; and
the controller is further configured to control the displacement of the hydraulic pump so that the pump absorption torque line is changed in accordance with the reduction of the tractive force.

15. The work vehicle according to claim 14, wherein
the controller has pump rotation speed data which defines a relationship between a standard rotation speed, which is the rotation speed of the engine when the absorption torque of the hydraulic pump reaches an upper limit on the pump absorption torque line, and the target rotation speed, and
the controller is further configured to
  refer to the pump rotation speed data to determine the standard rotation speed from the target rotation speed under the variable matching control, and
  control the rotation speed of the engine and the displacement of the hydraulic pump so that the output torque of the engine and the absorption torque of the hydraulic pump match each other at an intersection of the pump absorption torque line defined by the standard rotation speed, and the regulation line.

16. A method for controlling a work vehicle including an engine, a hydraulic pump driven by the engine, and a hydraulic motor that is driven by hydraulic fluid discharged from the hydraulic pump to travel the work vehicle, the method comprising:
  acquiring a tractive force of the work vehicle;
  controlling a rotation speed of the engine and a displacement of the hydraulic pump; and
  reducing the rotation speed of the engine in accordance with a reduction in the tractive force.

* * * * *